US011775749B1

(12) United States Patent
Liu et al.

(10) Patent No.: US 11,775,749 B1
(45) Date of Patent: Oct. 3, 2023

(54) CONTENT MASKING ATTACKS AGAINST INFORMATION-BASED SERVICES AND DEFENSES THERETO

(71) Applicant: University of South Florida, Tampa, FL (US)

(72) Inventors: Yao Liu, Tampa, FL (US); Zhuo Lu, Tampa, FL (US); Ian Davidson Markwood, Temple Terrace, FL (US); Dakun Shen, Land O lakes, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 111 days.

(21) Appl. No.: 17/136,892

(22) Filed: Dec. 29, 2020

Related U.S. Application Data

(62) Division of application No. 16/133,992, filed on Sep. 18, 2018, now Pat. No. 10,878,186.

(60) Provisional application No. 62/559,896, filed on Sep. 18, 2017.

(51) Int. Cl.
| | |
|---|---|
| *G06F 40/194* | (2020.01) |
| *H04N 1/00* | (2006.01) |
| *G06F 40/103* | (2020.01) |
| *G06F 40/216* | (2020.01) |
| *G06V 30/413* | (2022.01) |

(Continued)

(52) U.S. Cl.
CPC ........... *G06F 40/194* (2020.01); *G06F 18/29* (2023.01); *G06F 40/103* (2020.01); *G06F 40/216* (2020.01); *G06V 30/413* (2022.01); *G06V 30/418* (2022.01); *H04N 1/00843* (2013.01)

(58) Field of Classification Search
None
See application file for complete search history.

(56) References Cited

U.S. PATENT DOCUMENTS

| 5,883,986 A * | 3/1999 | Kopec ................. G06V 10/768 |
| | | 382/230 |
| 7,428,701 B1 | 9/2008 | Gavin |
| 7,480,441 B2 | 1/2009 | Tzadok |

(Continued)

OTHER PUBLICATIONS

James Heather, "Turnitoff: identifying and fixing a hole in current plagiarism detection software," Jul. 20, 2010, Assessment and Evaluation in Higher Education, 35:6, pp. 647-660. (Year: 2010).*

(Continued)

*Primary Examiner* — Kaveh Abrishamkar
(74) *Attorney, Agent, or Firm* — QUARLES & BRADY LLP

(57) ABSTRACT

The embodiments present a new class of content masking defenses against the Portable Document Format (PDF) standard. The defenses can identify attacks that cause documents to appear different than the underlying content extracted from the documents. A content masking defense method can include identifying a content masking attack by scanning a document file to extract a character code of a character appearing in the file. Next, the character is rendered based on a font that is embedded in the document file. Optical character recognition can be performed on the rendering, and a content masking attack can be identified based on a comparison of a result of the optical character recognition against the character code of the character.

17 Claims, 12 Drawing Sheets

(51) Int. Cl.
*G06V 30/418* (2022.01)
*G06F 18/20* (2023.01)

(56) References Cited

U.S. PATENT DOCUMENTS

| | | | |
|---|---|---|---|
| 7,876,335 B1 | 1/2011 | Pittenger | |
| 8,850,526 B2 | 9/2014 | Jayaraman | |
| 9,384,389 B1 * | 7/2016 | Sankaranarayanan | G06V 30/262 |
| 9,436,882 B2 | 9/2016 | Dahl | |
| 10,878,186 B1 * | 12/2020 | Liu | G06K 9/6296 |
| 2003/0007690 A1 * | 1/2003 | Rajagopal | G06V 10/42 382/209 |
| 2004/0037470 A1 * | 2/2004 | Simske | G06V 30/12 382/229 |
| 2009/0164881 A1 | 6/2009 | Segarra | |
| 2009/0204530 A1 * | 8/2009 | Hanson | G06Q 20/10 713/176 |
| 2010/0031140 A1 | 2/2010 | Cummin | |
| 2011/0191673 A1 | 8/2011 | Ikawa et al. | |
| 2012/0151600 A1 | 6/2012 | Yun et al. | |
| 2012/0159296 A1 | 6/2012 | Rebstock | |
| 2013/0024769 A1 | 1/2013 | Sumida et al. | |
| 2015/0163228 A1 | 6/2015 | Li | |
| 2015/0178476 A1 | 6/2015 | Horton | |
| 2018/0239981 A1 * | 8/2018 | Johnson | G06V 30/224 |
| 2019/0087390 A1 | 3/2019 | Kulekci et al. | |
| 2019/0163980 A1 * | 5/2019 | Johnson | G08G 1/0175 |

OTHER PUBLICATIONS

Heather, James,"Turnitoff: Identifying and Fixing a Hole in Current Plagiarism Detection Software", Assessment & Evaluation in Higher Education (2010). vol. 35 No. 6, pp. 647-660 https://doi.org/10.1080/02602938.2010.486471.

* cited by examiner

Ipf Owhqwvg wn Nwvgqghfvdm bve Azfeqdbhf
Awdsg qv b Qbhbcbgf Bmghfu

1N.A. Ogkbzbv, V.O. Wzbm, S.T. Awzqf, bve L.A. Izbqofz
LEH Sfgfbzdp Abcwzbhwzm Bbv Vwgf, Nbtqnwzvqb Abstract Lv cbhbcbgf gmghfug, igfzg bddfgg gpbzfc cbhb ivcfz hpf bggiuxhqwv hpbh
hpf cbhb gbhqgnqfg dfzhbqv dwvgqghfvdm dwvghzbqvhg. Ipqg xbxfz efnqvfg
hpf dwvdfxhg wn hzbvgbdhqwv, dwvgqghfvdm bve gdpfeitf bve gpwkg hpbh
dwvgqghfvdm zfyiqzfg hpbh b hzbvgbdhqwv dbvvwh zfyifgh vfk twdsg bnhfz

FIG. 9A b | "The Notions of Consistency and Predicate Locks in a Da 🔍

Web    Images    Videos    Maps    News    Explore

7 RESULTS    Any time ▾

[PDF] The Notions of Consistency and Predicate Locks in a ...
The Notions of Consistency and Predicate Locks in a Database System !C.P. Eswaran, J.N. Gray, R.A. Lorie, and I.L. Traiger IBM Research Laboratory San Jose, California

FIG. 9B

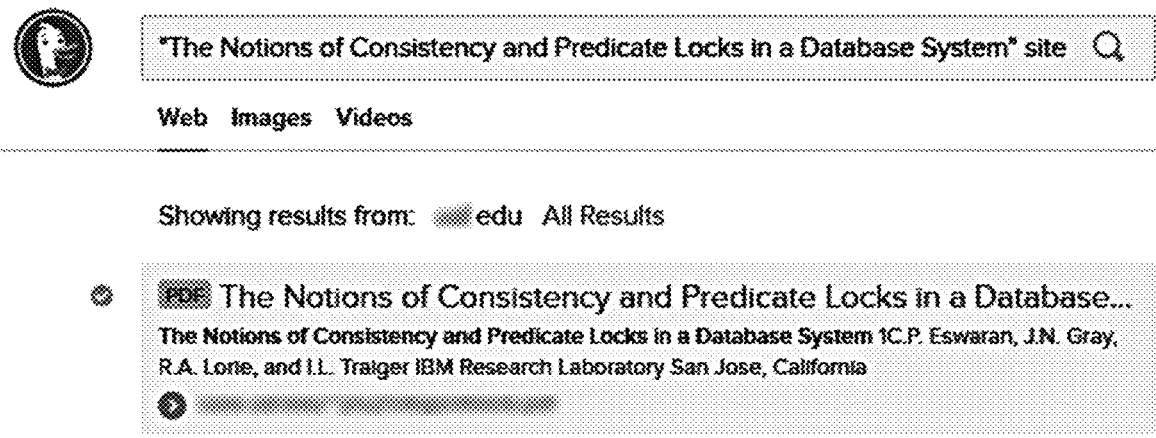
FIG. 9C
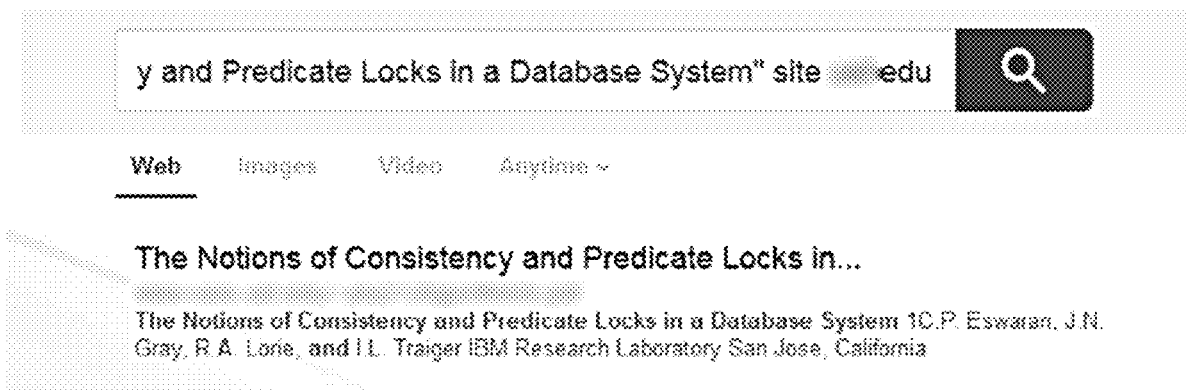
FIG. 9D
YAHOO!
Forbidden
This link is not authorized by Yahoo.
If you would like to continue to this link's intended destination *at your own risk*, click here.
FIG. 9E

CONTENT MASKING ATTACKS AGAINST INFORMATION-BASED SERVICES AND DEFENSES THERETO

CROSS-REFERENCE TO RELATED APPLICATIONS

This application is a divisional application of U.S. Non-Provisional application Ser. No. 16/133,992, entitled "CONTENT MASKING ATTACKS AGAINST INFORMATION-BASED SERVICES AND DEFENSES THERETO," filed Sep. 18, 2018, which claims the benefit of U.S. Provisional Application Ser. No. 62/559,896, filed Sep. 18, 2017, the entire contents of both of which applications are hereby incorporated herein by reference.

BACKGROUND

The Portable Document Format (PDF) has become the standard for electronic documents. The PDF format was designed as a solution for displaying formatted information consistently on computers different hardware and software configurations. Academic and collegiate papers, business write-ups and fact sheets, advertisements for print, and anything else meant to be viewed as a final product can use the PDF standard. Indeed, there is an element of constancy implied in the creation of a PDF document. End users cannot easily change the text of a PDF document, so most come to expect a degree of integrity present in all PDF documents encountered.

BRIEF DESCRIPTION OF THE DRAWINGS

For a more complete understanding of the embodiments and the advantages thereof, reference is now made to the following description, in conjunction with the accompanying figures briefly described as follows:

FIGS. 9A-9E illustrate results of the context masking attack against search engines according to various examples described herein.

Figure 1:
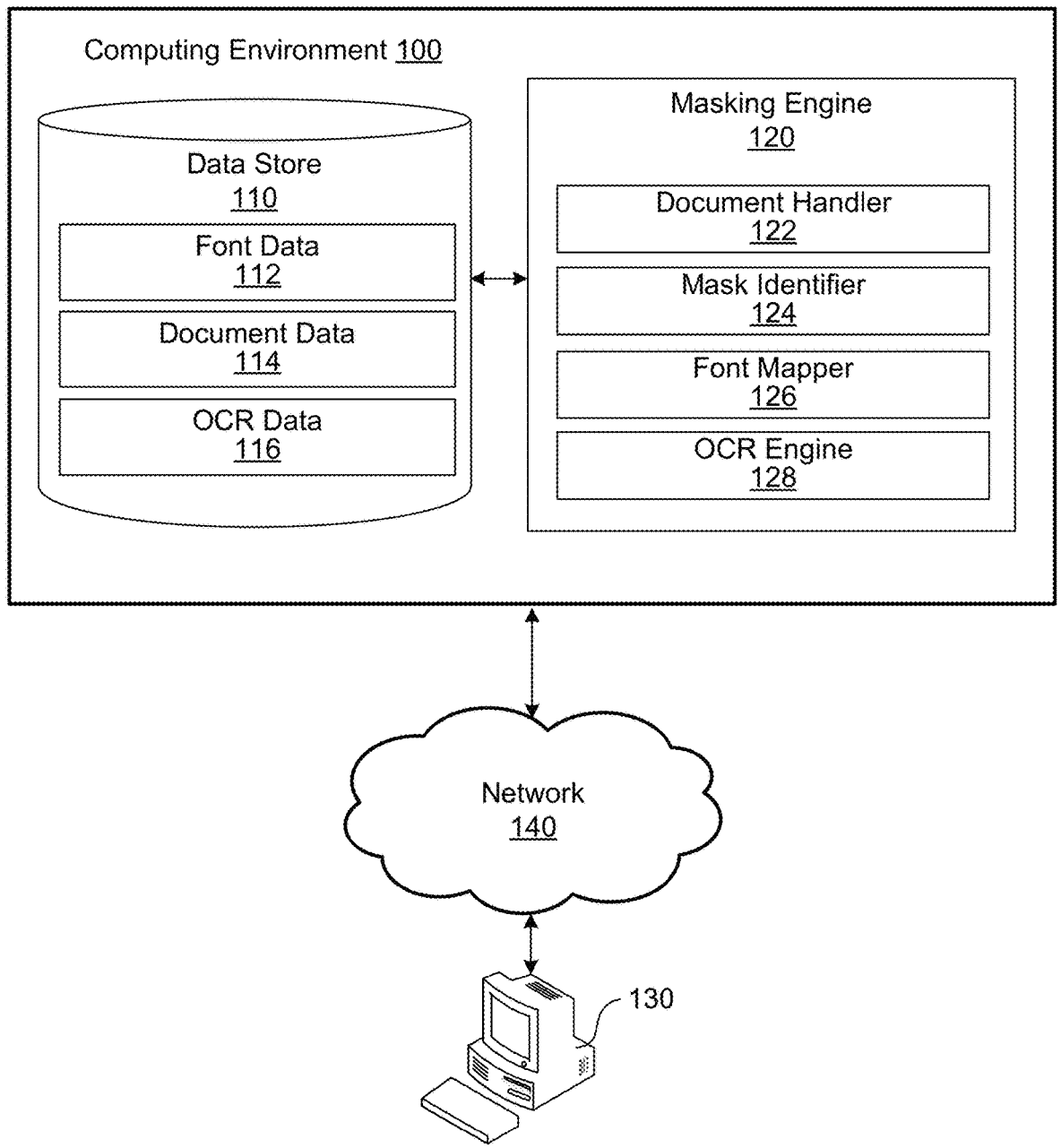
FIG. 1 illustrates an example of a networked computer environment for content masking and content masking detection according to various examples described herein.

The drawings illustrate only example embodiments and are therefore not to be considered limiting of the scope of the embodiments described herein, as other embodiments are within the scope of the disclosure.

DETAILED DESCRIPTION

One industry-accepted PDF standard contains eight basic types of objects, including strings. Strings include the machine-interpretable text of a PDF file, which can be formatted as plain text, octal or hexadecimal representations of plain text, or text with some type of encoding. PDF rendering software operates on each string as a series of character identifiers (CIDs) or character codes, each mapping to a corresponding glyph of a font via the Character Map (CMap). A series of glyphs can thus be rendered and displayed, for interpretation by individuals, based on the strings. Stings can be extracted from PDF files using tools like the Python package PDFMiner. These tools extract text by copying the string objects in a PDF file. Though these tools can extract the font name for each string, a whitelist of known fonts cannot be relied upon to confirm the authenticity of fonts, because fonts in PDF files may be given any name.

Various attacks to the Portable Document Format (PDF) format have been studied based on JavaScript code execution within the rendering process of a PDF file, for example, and other rendering vulnerabilities. These attacks typically achieve data exfiltration, botnet creation, or other objectives unrelated to the PDF file itself. Here, a class of attacks against the content integrity of PDF documents themselves are presented, followed by a description of a defense method against these attacks.

As an example of a first type of attack, a writer of an academic paper can invisibly alter a PDF copy of the paper, so that it is assigned to certain reviewers by automatic reviewer assignment systems, such as that used by the Institute of Electrical and Electronics Engineers (IEEE) International Conference on Computer Communications (INFOCOM) that openly publishes its automated algorithm.

As an example of a second type of attack, a student can invisibly alter a PDF document to avoid plagiarism detection, such as Turnitin®. The student can also generalize methods to target small plagiarism similarity scores to simulate the minimal number of false positives that such systems typically detect.

As an example of a third type of attack described herein, real-world examples of making leading search engines display arbitrary (e.g., potentially spam, offensive material, etc.) results are shown for innocuous key-words. Bing®, Yahoo! ®, and DuckDuckGo® have been successfully shown to index five PDF documents under keywords not displayed in those documents.

Automatic assignment, plagiarism detection, and search engine systems all scrape PDFs for their content for further processing. PDF documents can be scraped by text extraction tools, such as the PDFMiner package and other tools. However, various fonts can be embedded in PDF documents, and these tools cannot check the authenticity of the fonts. A font is actually similar to an encoding mechanism, as it maps keys pressed on a keyboard (e.g., American Standard Code for Information Interchange (ASCII) character codes, event codes, etc.)("keycodes") to glyphs representing those keys. Without some way to verify fonts in a PDF, the glyphs mapped to keys can be arbitrary. Moreover, individuals reading a PDF see the rendered version of the glyphs, whereas PDFMiner, on the other hand, reads character codes. Thus, depending upon the font used, machines and individuals can read different information.

Consequently, in any of the ways suggested above, among others, various PDF document scraping environments can be misused through the remapping of key character codes to glyphs. Using one or more custom fonts, an attacker may cause a word to be rendered as another word by modifying the keycode-to-glyph mapping of the font. Alternatively, the attacker can modify the underlying keycodes while keeping a constant output of rendered glyphs.

As one example, the word "kind" can be masked to be visually interpreted by an individual as the word "mean" by creating a modified font mapping of the standard keycode for "k" to a glyph that renders as "m," and i→e, n→a, and d→n. In that case, the individual will see and read the word "mean," while the machine interprets the keycodes for the word "kind."

As another example, an attacker can change the underlying keycodes to result in a machine interpretation of the word "mean," while an individual sees and reads the word "kind." This tactic can be used to subvert machine-related end applications, while still rendering PDFs in normal appearance to readers. This approach can be referred to as a content masking attack, as readers view a masked version of the content as compared to what machine-related end applications interpret.

Turning to the drawings, the following paragraphs provide an outline of a networked environment for content masking and content masking detection followed by a discussion of the operation of the same. FIG. 1 illustrates an example of a networked computer environment 10 for content masking and content masking detection according to various examples described herein. The networked environment 10 includes a computing environment 100, a number of client devices 130, and a network 140.

The computing environment 10 can be embodied as one or more computers, computing devices, or computing systems. In certain embodiments, the computing environment 100 can include one or more computing devices arranged, for example, in one or more server or computer banks. The computing environment 100 can include one or more computing devices that together embody a hosted computing resource, a grid computing resource, or other distributed computing arrangement. As further described below, the computing environment 100 can also be embodied, in part, as certain functional or logical (e.g., computer-readable instruction) elements or modules as described herein.

The computing environment 100 can operate as an environment for content masking and content masking detection. In that context, the computing environment 100 includes a data store 110 and a masking engine 120. The data store 110 includes areas in memory for the storage of font data 112, document data 114, and optical character recognition (OCR) data among other types of data. The masking engine 120 includes a document handler 122, a mask identifier 124, a font mapper 126, and an OCR engine among other functional components.

As an introduction, the font data 112 can include a scratch memory area for one or more font packages to be embedded into documents, including PDF documents. The document data 114 can include a scratch memory area for PDF and other related documents being processed by the masking engine 120, including the text strings embedded in those documents. The OCR data can include a scratch memory area for use by the OCR engine 128.

The document handler 122 of the masking engine 120 can be configured to open, parse, embed fonts into, save, and perform other tasks on PDF and related documents. Depending upon the type of content masking attack, the mask identifier 124 is configured to identify topic words to be masked in a subject document and construct character or word mappings for content masking attacks, among other tasks described herein. The font mapper 126 is configured to construct one or more masking fonts, as needed, such that certain characters map to the certain glyphs. To detect and thwart content masking attacks, the OCR engine 128 can render one or more character glyphs from a PDF and compare the results to the text strings from the PDF. Additional operations of the components of the computing environment 100 are described below.

The client devices 130 are representative of one or more client devices. Each client device 130 can be embodied as any computing device, processing circuit, or processor based device or system, including those in the form of a desktop computer, a laptop computer, a tablet computer, a personal digital assistant, a cellular telephone, or a wearable computing device, among other example computing devices and systems. Depending upon its primary purpose or function, for example, the client devices 130 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors.

The client devices 130 can be relied upon by authors, writers, and other individuals to draft documents, convert those documents to PDF files, transfer those documents and files to the computing environment 100 for analysis, and conduct other tasks. In some embodiments, the components of the computing environment 100 and one or more of the client devices 130 can be merged together, and the network 140 can be omitted.

The network 140 can include the Internet, intranets, extranets, wide area networks (WANs), local area networks (LANs), wired networks, wireless networks, cable networks, satellite networks, other suitable networks, or any combinations thereof. As one example, the computing environment 100 and the client devices 130 can be respectively coupled to one or more public or private LANs or WANs and, in turn, to the Internet for communication of data among each other. Although not shown in FIG. 1, the network 140 can also include communicative connections to any number and type of network hosts or devices, such as website servers, file servers, cloud computing resources, databases, data stores, or any other network or computing architectures.

As described herein, content masking attacks are facilitated, at least in part, by embedding custom fonts within PDF documents. In fact, having all fonts embedded is a formatting requirement for the submission of academic papers to conferences. However, no integrity check is performed on those fonts as to the proper correlation between text strings within the PDF file and the respective glyphs rendered in the PDF viewer. An attacker may map characters to arbitrary glyphs and alter the text extracted from a PDF document while it appears unchanged to humans in a PDF viewer. This requires two steps, first to create the requisite font files and second to encode the text via these font files.

The first step can employ one of the multiple open source multi-platform font editing tools such as Font-Forge, and the font mapper 126 can incorporate similar tools. With this tool, one can open a font and directly edit the character glyphs with the typical vector graphics toolbox, or copy the glyph for a character and paste it into the entry for another character. One can then edit the PDF file directly with open source tools such as QPDF, or in the case of manipulating academic papers, quicken the process by adding custom fonts in $L^A T_E X$ and aliasing each to a simple command. The latter method employs the program ttf2tfm, included with $L^A T_E X$, to convert TrueType fonts to "TeX font metric" fonts which are usable by $L^A T_E X$. Two $L^A T_E X$ code files are supplied by: T1-WGL4.enc for encoding, and t1custom.fd for easy importing of the font into a $L^A T_E X$ document. The second step of choosing how to mask content and what in a document to encode with custom fonts depends on the system targeted, and the technique and evaluation for each of the three types of attacks is presented below.

Content Masking Attack Against Reviewer Assignment Systems

To assign papers to reviewers for a conference, several large conferences employ automated systems to compare the subject paper with a corpus of papers written by each reviewer to find the best match. This matching is executed upon the most important topics, or keywords, found in the paper via natural language processing methods. If an author replaces the keywords of a paper with those of a reviewer's paper, a high match is guaranteed, and the two may thereby collude. By creating custom glyph mappings for characters, the masked paper can make perfect sense to the human eye, while the underlying text read by the machine has many substituted words which would not make sense to a reader. This exploit has the technical challenges of replacing words of differing lengths (larger and smaller replacements require different methods) and also constructing multiple fonts required for different mappings of the same letter (for example, to map the word "green" to "brown" requires two different font mappings for e). A naive defense could check the number of fonts embedded, and algorithms can be designed to minimize the number of auxiliary fonts used in order to avoid detection.

Latent semantic indexing (LSI) is a popular natural language processing algorithm for extracting topics from documents. The LSI approach infers synonymous words/phrases to be those with similar surrounding contexts, rather than constructing a thesaurus. These detected patterns can allow singular value decomposition to reduce the number of important words in a document such that it may be represented by a small subset. This small subset, of cardinality k, then contains frequency data for each element, such that the document may be represented by a dot in k-space. Similarity between documents is easily calculated via their Euclidean distances apart in this geometric representation.

Latent dirichlet allocation (LDA) is a newer popular topic extraction algorithm, which is generally speaking a probabilistic extension of LSI. Topics are generated as collections of related words, using supervised learning. The probability of a document corresponding to each of the predefined topics is calculated based on how well the words within the document correspond to the words within each topic.

Topic matching is used within the automation of the review assignment process for several large conferences, such as the ACM Conference on Computer and Communications Security (CCS) or the IEEE INFOCOM. These conferences receive many submissions and have many reviewers, and the manual task of finding the most suitable reviewers for each paper is onerous, so they automate by comparing topics extracted from subject papers and papers published by reviewers. A performance comparison was executed between LSI and LDA for use in the (as of 2016) INFOCOM reviewer assignment system, which uses PDFMiner for text extraction, finding LSI to work well with submitted academic papers. The experiments described herein were thus conducted using LSI to determine the important keywords of papers, and the attack functions equivalently use LDA.

In general, the assignment of conference paper submissions to reviewers is accomplished by finding the highest similarity between detected topics within submissions and those within a corpus of the reviewers' papers. A writer may wish to direct his or her paper to specific reviewers known to be more generous or less critical. This writer can content mask the topic of his or her paper to target a specific reviewer, by masking words corresponding to the topic of his or her paper with the topic words of one or more papers from the reviewer's corpus.

Thus, to begin with content masking against a reviewer assignment system, the mask identifier 124 is configured to identify a number of topic words in a target document, such as words of one or more papers from the reviewer's corpus. The papers from the reviewer's corpus can be stored in the document data 114 in the data store 110 for processing, and the topic words can be stored in the data store 110 as well.

The mask identifier 124 is then configured to identify a number of words in a document file, such as a paper of a writer to be submitted for conference review, to be masked. To attack and subvert the reviewer assignment system, the words in the document file can be masked as the number of topic words in the target document.

To identify the words in the document file to be masked, the mask identifier 124 can eliminate any stop words. These are common words in the document file, such as "the," "of," "her," or "from." The stop words can be identified and removed from consideration by the mask identifier 124 using tools or approaches similar to the Natural Language Toolkit (NLTK) Python package, for example, among other packages that achieve similar results. With the stop words removed, one approach is to replace the most frequently used words in the document file with the most frequently used words in the target reviewer's paper. This will result in the most frequently used words in the target paper also appearing in the document file, for a high similarity score as measured by the LSI method within the automatic reviewer assignment system.

Consider word lists A and B having constituent words $\{a_1, a_2, \ldots a_n\}$ and $\{b_1, b_2, \ldots b_n\}$, in descending order of appearance within the subject and target papers, respectively. The mask identifier 124 and the font mapper 126 are configured to replace words A with words B and, therefore, replace each word $a_i$ within the text of the subject paper with a word $b_i$, encoded using one or more fonts to render $b_i$ in a manner that is graphically equivalent to the original rendering of $a_i$ (a word mapping). No other words should or need be changed.

Thus, the mask identifier 124 is configured to construct a character mapping between the letters of each $b_i$ and $a_i$ (a character mapping). Based on the character mapping, if $a_i$ and $b_i$ are character arrays $\{a_i[1], a_i[2], \ldots a_i[p_i]\}$ and $\{b_i[1], b_i[2], \ldots b_i[p_i]\}$, then the font mapper 126 can construct a masking font such that the character $b_i[1]$ maps to the glyph $a_i[1]$. Further, the font mapper 126 can construct the masking font such that the character $b_i[2]$ maps to the glyph $a_i[2]$, etc. This can be considered analogous to a map data structure, where $b_i[1]$ is a key and $a_i[1]$ its value, and so on.

Certain challenges can arise in constructing the character mappings. For example, if changing the word "green" to "brown," there is a collision for the key e and the values o and w, such that the font mapper 126 can be configured to create and rely upon two different masking font "maps" to render "green" as "brown." This challenge can be described the "One-to-Many Character Mapping" challenge.

The mask identifier 124 and/or the font mapper 126 can be configured to minimize the number of fonts required in the content masking document, so as to avoid suspicion, while fully switching topic A to topic B. This problem is not delimited by word because some character mappings may be reused in the same or other words, but many may not. Additionally, changing all of the words in A to those in B may be unnecessary, which also impacts the number of one-to-many mappings and resultant number of required font files. If fewer words must be changed while ensuring the required similarity between papers, fewer fonts may be required, and a naive font count threshold defense will be less effective.

Further, the lengths", and $q_i$ of words $a_i$ and $b_i$ may differ, causing $a_i$ to be longer than $b_i$ or vice versa. If $p_i > q_i$, a font file entry is necessary for the letter $b_i[q_i]$ mapping to the last $p_i - q_i + 1$ letters of alto render $b_i$ as $a_i$. Several additional fonts may be necessary if some $b_i \in B$ have the same last character. Thus, a favorable keyword mapping can be defined as one that maps $b_i \rightarrow a_i$, such that $p_i < q_i$. In that case, the font mapper 126 can rely on only single clearing font, where all characters map to a blank glyph of no width.

Figure 2:
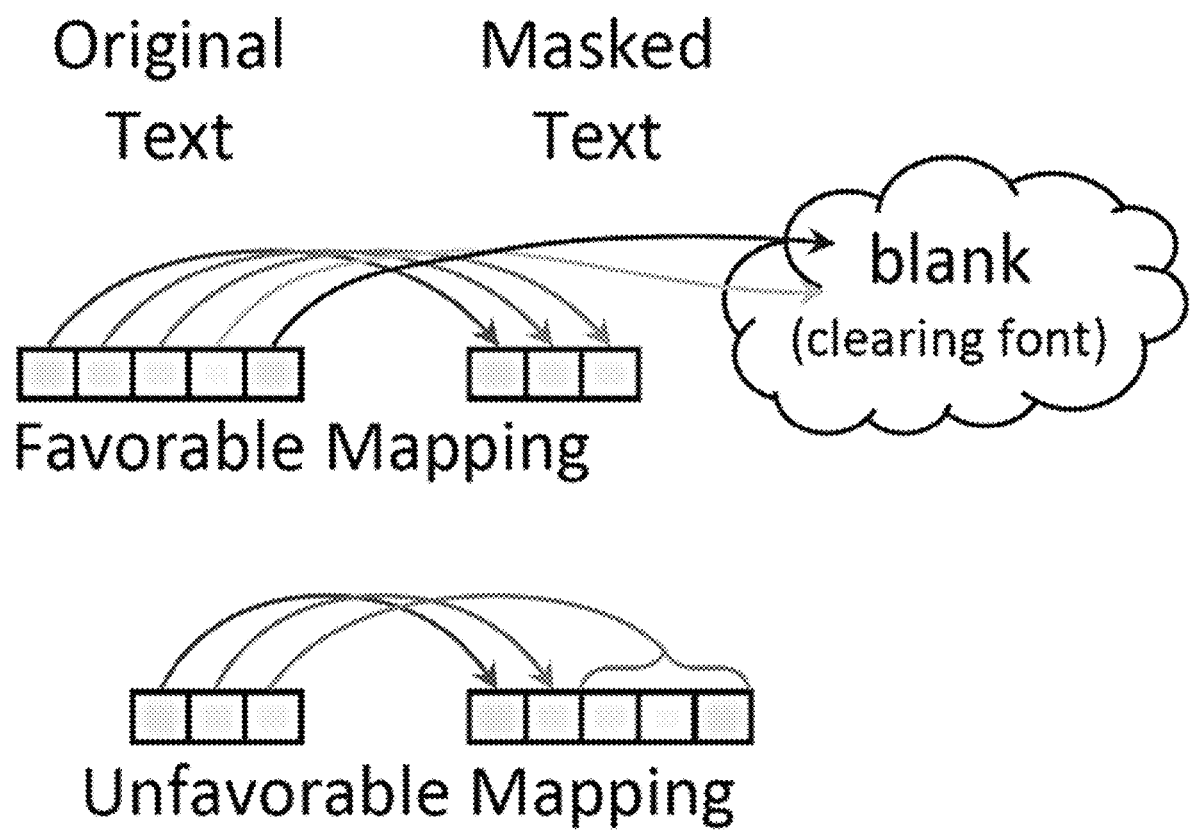
FIG. 2 illustrates an example of favorable and unfavorable mappings associated with one-to-many character mapping and word length disparity challenges according to various examples described herein.

FIG. 2 illustrates an example of favorable and unfavorable mappings associated with one-to-many character mapping and word length disparity challenges. In practice, a blank glyph of no width is in fact a single dot of width (and height) equal to the smallest unit of measure within a font rendering program. In contrast, for example, an i is can be 569 units wide (and a w is 1500 units wide). So, the single dot will not appear to be rendered at all. Because the clearing font has all letters map to no-width blanks, it will be the only additional font required if $\forall$ i, $p_i < q_i$, hence its favorability. The mask identifier 124 can be configured to process based on a preference for favorable mappings.

In one embodiment, the mask identifier 124 is configured to map from B to A by their original descending order of frequency within target and subject papers, respectively. Algorithm 1, below, shows one example encoding process that can be executed by the masking identifier 124. The process begins by running the LSI model on the target and subject papers, then constructing a map between characters in k of the topic words returned. Then, the mapping is added to C for each character, for each word of B, to the corresponding character(s) in the corresponding word of A. Comments (at lines 7, 12, 17) indicate the steps taken for favorable and unfavorable mappings and the case when both words are of the same length. Finally at line 22, the mappings in C are broken up into collections to be made into custom masking fonts, with the exception of those characters from favorable mappings which map to null, for which the single clearing font can be used. The results of this algorithm are fonts to be used for each character of the words in B to mask them as the words in A. If there are multiple papers under submission, this process may be repeated independently for each paper.

---

Algorithm 1 Build Character Map

---

Input: subject paper s, target paper t
Output: character mapping C : B → A, encoding fonts
  $F = \{f_1, f_2, \ldots, f_x\}$
1:   A ← top k topic words of LSI(s)
2:   B ← top k topic words of LSI(t)
3:   C ← empty character map
4:   for i ← 1 to k do
5:     $p_i$ ← length($a_i$)
6:     $q_i$ ← length($b_i$)
7:     if $p_i < q_i$ then          ▷ favorable mapping
8:       for j ← 1 to $p_i$ do
9:         C ← C ∪ $\{(b_i[j], a_i[j])\}$
10:      for j ← pi + 1 to qi do
11:        C ← C ∪ $\{(b_i[j], \emptyset)\}$
12:    else if $p_i < q_i$ then      ▷ unfavorable mapping
13:      for j ← 1 to $q_i$ − 1 do
14:        C ← C ∪ $\{(b_i[j], a_i[j])\}$
15:      rest ← combine $\{(a_i[q_i], \ldots, a_i[p_i])\}$
16:      C ← C ∪ $\{(b_i[q_i], rest)\}$
17:    else                          ▷ equal word length
18:      for j ← 1 to $q_i$ do
19:        C ← C ∪ $\{(b_i[j], a_i[j])\}$
20:  x ← largest number of key collisions in C
21:  temp ← C
22:  for i ← 1 to x do               ▷ build fonts
23:    $f_i$ ← empty font
24:    for each c ∈ C do
25:      if value in c is ∅ then
26:        C ← C \ $\{c\}$
27:        use clearing font for key in c
28:      else if no key collision between c, $f_i$ then
29:        C ← C \ $\{c\}$
30:        $f_i$ ← $f_i$ ∪ $\{c\}$
31:    F ← F ∪ $f_i$
32:    C ← temp
33:  return C, F

---

In another embodiment, the masking identifier 124 is configured to split up the words to be masked among two (or more) different lists of frequently used words. In that scenario, rather than mapping between word lists A and B, the masking identifier 124 is configured to map between A and B and A and C, such that $a_1$ will be replaced with $b_1$ part of the time and $a_1$ will be replaced with ci the rest of the time, and so on. The method is otherwise the same as shown in Algorithm 1, but has certain challenges.

Intuition would suggest replacing $a_1$ half of the time with $b_1$ and half of the time with ci. However, the requirement for the content masked paper to be the most similar to a reviewer's paper out of a large number of other papers and also the most similar to another reviewer's paper out of the others is quite stringent. The intuitive method fails as the similarity score for one target reviewer will be high enough but the other too low. Thus, the masking identifier 124 can be configured to perform an iterative refinement method which tunes the replacement percentages according to the calculated similarity scores until they are both the highest among their peers. This is generalizable to more than two reviewers, by refining the percentages proportionally according to the successive differences in similarity scores between the subject or content masked paper and each of the target papers. One paper can be matched to three reviewers, the typical number of reviewers to which papers are assigned (barring contention in reviews, which would not happen during collusion), as described below.

The conference simulation system relied upon in the experiments described herein is designed to reproduce the INFOCOM automatic assignment process. In one experiment, the process imported 114 members from a well-known recent security conference as reviewers and downloaded a collection of each of these reviewers' papers published in recent years. In total, this comprised 2094 papers used as training data for the automatic reviewer assignment system. For testing data, 100 papers published in the field of computer science field were also downloaded. The experiment was to test the topic matching of the test papers with the training papers, via the content masking attack used by the masking engine 120 described herein.

As part of the automatic reviewer assignment process, the mask identifier 124 can compare a subject paper with every paper from the collection of reviewers' papers to gather a list of similarity scores. The reviewer with the highest similarity score is assigned the paper to judge (if available). The aim is to change the topic of a testing paper to the topic of a training paper and to examine how well this works with all papers. For each such pair of papers, the mask identifier 124 and the font mapper 126 identify and replace the frequently appearing words A in the testing paper with those frequently appearing words B in the training paper via Algorithm 1. The topic matching of each of the 100 testing papers is tested against training data to see what is required to induce a match.

Figure 3:
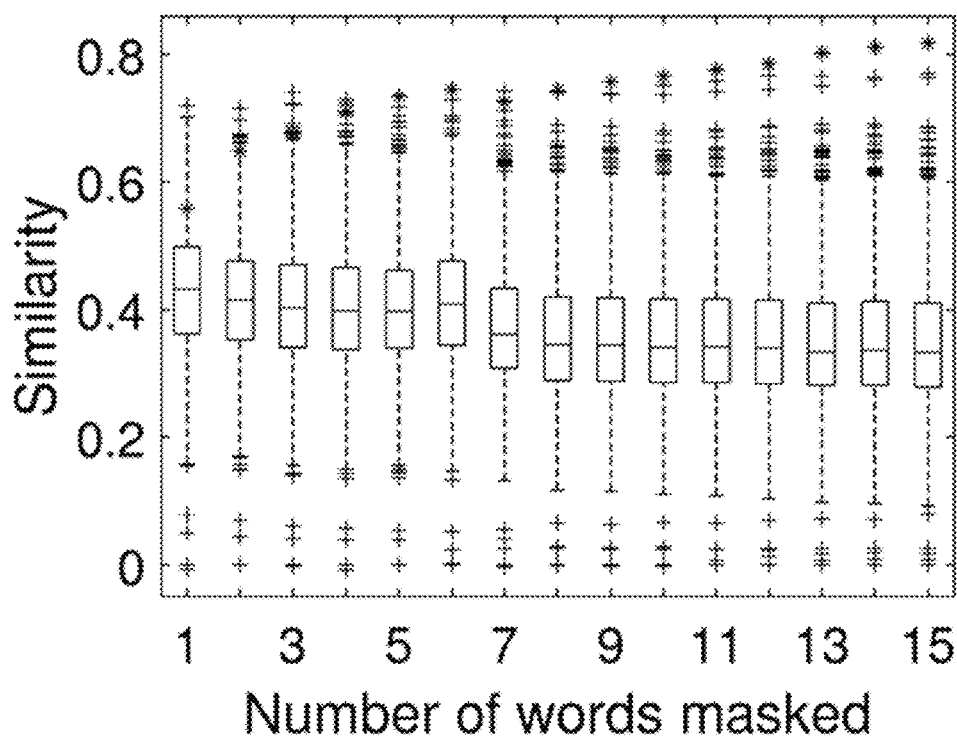
FIG. 3 illustrates the resultant similarity scores of an iterative process for replacing words between training/testing paper pairs according to various examples described herein.

For each pair of training and testing papers, important words in the testing paper are replaced, one by one, to see how many replacements are needed to make that pair the most similar. FIG. 3 illustrates the resultant similarity scores of an iterative process for replacing words between testing/training paper pairs according to various examples described herein. In FIG. 3, the box plots show where the greatest concentration of the 2094 similarity scores dwell, and the pluses show outliers. The stars or asterisk which emerge to the top correspond to the similarity scores between the testing paper and the target training paper. FIG. 3 shows a clear separation of that similarity score from the rest after replacing nine words, meaning that for this pair, content masking all appearances of those nine unique words in the testing paper will result in its assignment to the reviewer who wrote that training paper.

Figure 4:
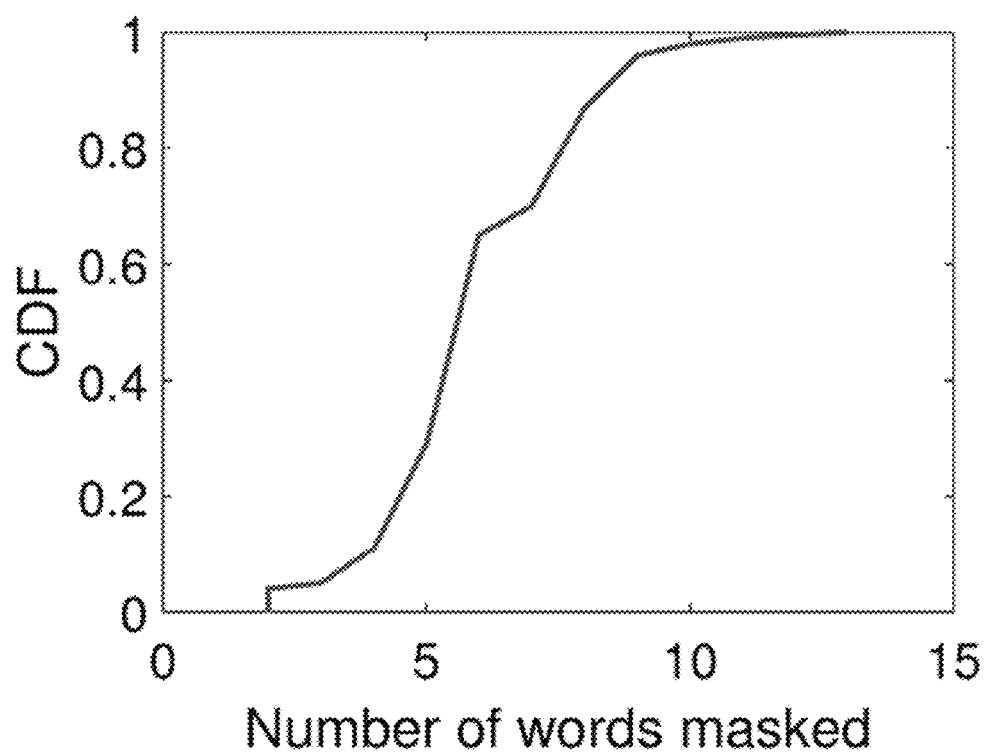
FIG. 4 illustrates the results of an iterative process shown in FIG. 2 for 100 paper pairs according to various examples described herein.
Figure 5:
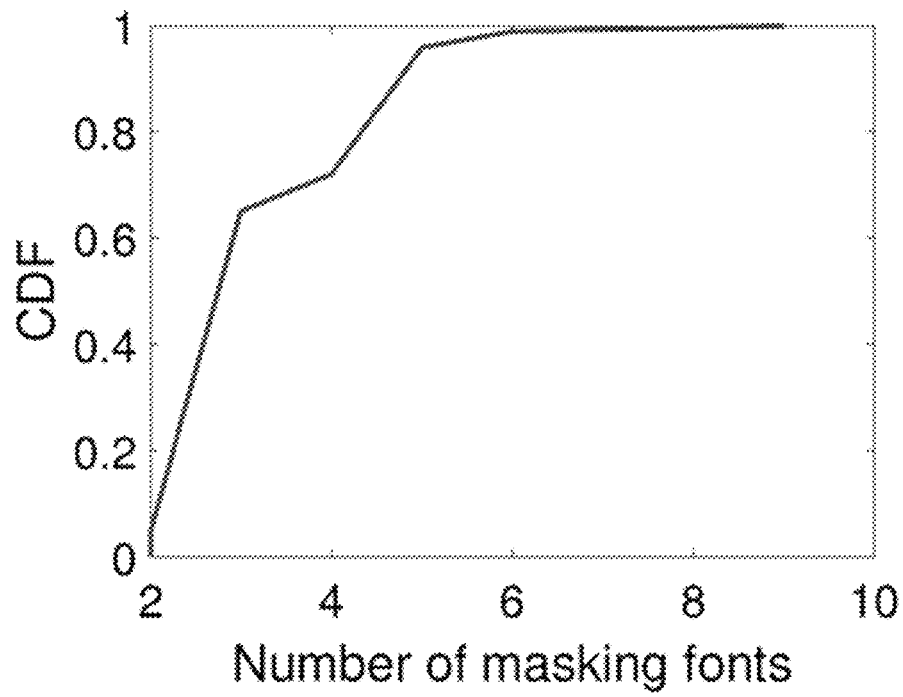
FIG. 5 illustrates masking font requirements for replacing words from 1 to 100 papers according to various examples described herein.

The results from performing this process for all 100 testing papers are compiled in FIG. 4, which displays the cumulative distribution function (CDF) for the number of words requiring replacement. FIG. 5 illustrates masking font requirements for replacing words from 1 to 100 papers. As shown, all 100 papers may be matched with the target with 12 words or fewer masked. The sharp jump appearing between 4 and 9 words indicates that most papers can be successfully targeted to a specific reviewer by masking between 4 and 9 words. From FIG. 5, it is clear that a majority of papers require three or fewer masking fonts, while almost all of them need only as many as five masking fonts. This is a comparatively small number and should go unnoticed among the collection of fonts natural to academic papers.

Figure 6:
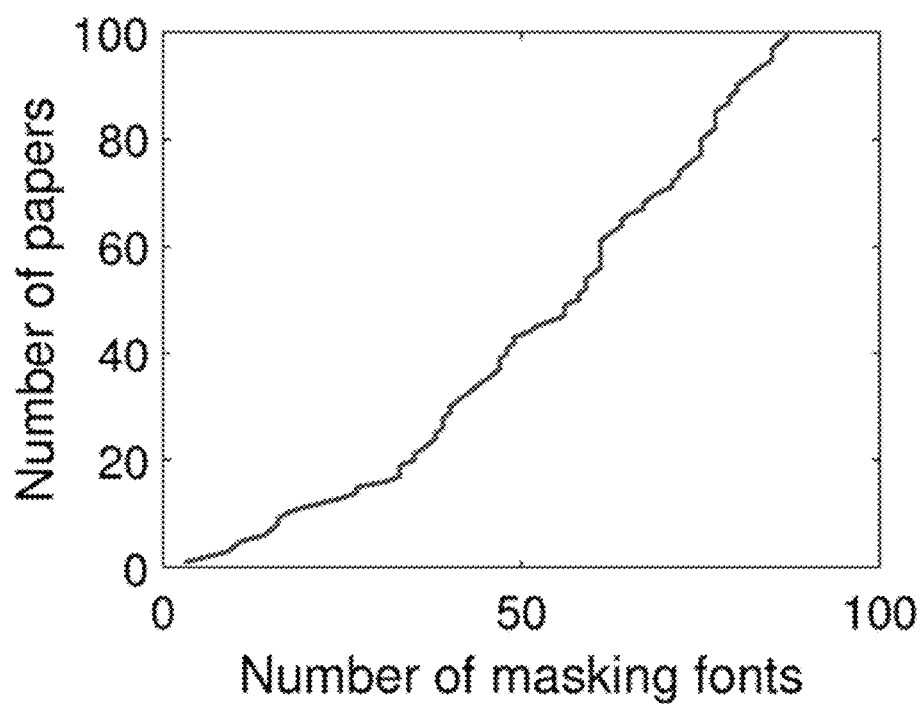
FIG. 6 illustrates masking font requirements for matching from 1 to all 100 testing papers to a single reviewer according to various examples described herein.

Should a writer wish to have multiple papers all assigned to a target reviewer, the writer can repeat the content masking process on each paper. While in the previous case it was shown that an average of three or four fonts can be used to make a test paper sufficiently similar to a target training paper, it is not necessarily the case that three or four fonts are needed for each paper. Some fonts may be reused, resulting in fewer overall fonts used. FIG. 6 confirms this, showing a trend more logarithmic than linear.

Figure 7:
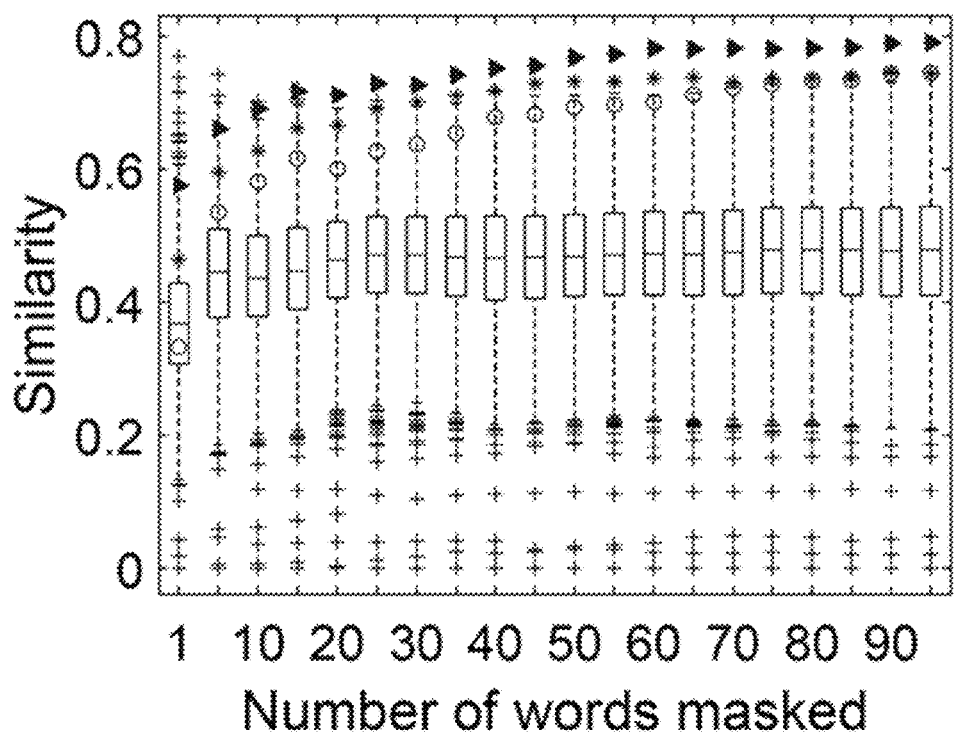
FIG. 7 illustrates similarity scores relative to the number of words masked, between a paper and three reviewers, according to various examples described herein.

Finally, the iterative refinement method can be evaluated to split masked words among three reviewers' papers. FIG. 7 shows that the similarity scores for three target reviewers (i.e., star, circle, and triangle) consistently increase. After some 70 words are masked, the subject paper is more similar to the three target papers than any others.

Content Masking Attack Against Plagiarism Detection

Turnitin® has the dominant market share for plagiarism detection software. Its software is proprietary, but current documentation states "Turnitin will not accept PDF image files, forms, or port-folios, files that do not contain highlightable text," indicating that PDFMiner or some similar internally developed tool is used to scrape the text from PDF documents. It can be assumed that OCR is not used, meaning that the proposed attacks described herein should succeed, as indicated below.

The Turnitin® documentation also states that "All document data must be encoded using UTF-8 character set." As described below, text may have custom encodings, but they are not permitted by Turnitin®. This disallows any attack where text, gibberish in appearance, is translated via decoding into legible text. However, no restriction on fonts is in place, due to the necessary ability for the client institutions of Turnitin® to specify their own format requirements.

The content masking attacks described herein can also undermine plagiarism detection such as that performed by Turnitin® and similar tools. In this case, only isolated characters need to be switched out to change plagiarized text to previously unwritten text, while again masking these changes as the original text to the human reader. In fact, as most papers have a small (false positive) percentage of similarity present due to common phrases within the English language, this method simulates isolated character changes by varying the number of characters changed. Only one font is required to make this mapping, as the resultant text does not need to make sense to the plagiarism detector. Thus, for example, all rendered e's may be represented by some other letter in a font that maps that key to the glyph e, and other letters may be changed similarly, building a one-to-one mapping covering at most all letters. The challenge is to target a small plagiarism percentage, and a single embedded font bearing the name of a popular font will cause no suspicion.

Fewer requirements constrain the plagiarist than the writer targeting a specific reviewer. To mask against plagiarism detection, the mask identifier 124 and/or the font mapper 126 need only make the underlying text different than the rendered, plagiarized text. The underlying text may not need to be actual words. Thus, the font mapper 126 can rely upon only one font, ensuring the defense of limiting fonts is defeated. The font mapper 126 can create a "scrambling" font according to a random scrambling of characters. Particularly, the font mapper 126 can generate a scrambling font in which each original letter is scrambled to render using a glyph associated with another character. The document handler 122 can then embed the scrambling font into the document and associate the scrambling font with at least one string of text in the document. When the document is analyzed for plagiarism using plagiarism detection software such as Turnitin®, the result may be a similarity score of 0%, meaning that the document bears no similarity to other documents. The result is a human-legible PDF document which appears as gibberish to the plagiarism detection software.

Turnitin® checks similarity of words and phrases to detect plagiarism. Turnitin® informs the individual with grading duties of any pieces of similar prose, which naturally arise due to the plethora of written work in existence and the human tendency toward common patterns and figures of speech. It is unlikely, then, that a submission would have 0% similarity with anything ever written. Thus, the masking engine 120 can be configured to apply a number of methods to target a specific (low but non-zero) similarity score.

To target a certain similarity score, the masking identifier 124 and font mapper 126 can be configured to generate a scrambling font. Then, the masking identifier 124 and font mapper 126 can remove characters from being scrambled in the scrambling font, successively, until a target percentage of the text is not being replaced. Between iterations of removing characters from being scrambled, the document handler 122 can embed the scrambling font into the document and associate the scrambling font with at least one string of text in the document.

The masking engine 210 can also determine a similarity score for the document, between iterations, using plagiarism detection software, to determine whether or not the target similarity score has been achieved. A certain percentage would then appear plagiarized depending upon the number of unscrambled characters. Intuitively, this small target percentage would then appear plagiarized, yielding a credible similarity score. The masking engine 210 can conduct this process until the similarity score for the document meets or exceeds a predetermined small (low but non-zero) similarity score threshold.

The masking identifier 124 can conduct this process in a calculated fashion using the known frequency of usage of letters in the English (or other) language, for example, or based on another relevant criteria. The letters can be listed by their frequency in ascending or descending order and then excluded from scrambling in that order until the target percentage of unaltered text is reached.

In another embodiment, instead of leaving some characters unscrambled in the custom font, the masking engine 210 can leave some words unaltered by not applying the custom scrambling font to them. In that case, when the scrambling font is embedded into the document, the masking engine 210 can associate it with only certain words in the document. To that end, words within the document may be listed in frequency of appearance, ascending or descending, and excluded from the scrambling font in that order. Changing words at random with a probability targeting some similarity score is also considered. This approach may be more effective if Turnitin® implements a requirement that some percentage of words be found in a dictionary, English or otherwise. In that case, this attack may be augmented by the previously described method of replacing real words for other real words rendered as the originals.

An experiment to test the plagiarism content masking attack includes 10 already published papers retrieved from the Internet and masks the content in varying degrees to see the effects on Turnitin's® returned similarity scores. The amount a scrambling font is applied varies to the text according to the previously described methods. The resultant papers are uploaded to Turnitin®. Again, a specific range of similarity scores are targeted, between 5% and 15%, such that a human grader is unlikely to suspect a problem.

Figure 8:
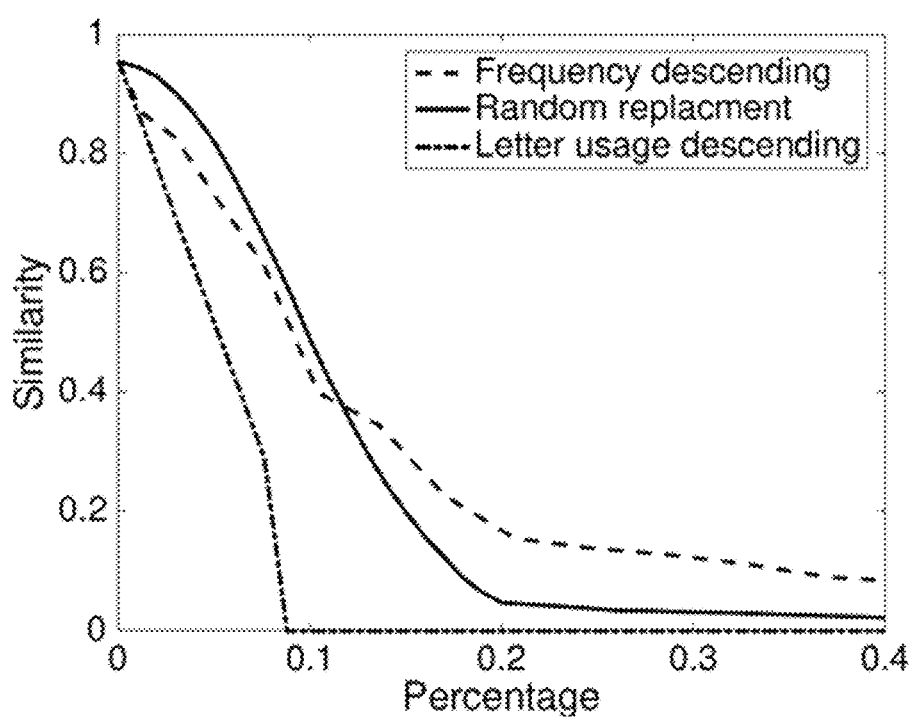
FIG. 8 illustrates a plot of the percentage of text changed upon plagiarism similarity scores for 10 sample documents according to various examples described herein.

FIG. 8 plots the three methods. "Frequency descending" refers to the method of masking words in the order of their frequency of appearance in the document, while "Letter usage descending" refers to masking letters by their frequency of usage. Ascending order, which proved unwieldy in both cases, is not shown. Finally, "Random replacement" refers to the method of iterating over all words and masking them with a probability of 1-100% in increments of 1%. These are all plotted in terms of the percentage of text changed.

Masking letters by their frequency of usage results in a similarity curve that may be too steep to be manageable for selecting a small range of similarity scores. In contrast, the other two methods are suitable for comfortably picking a specific range. Any probability between 17% and 20% will result in a similarity score in our desired 5-15% range in the case of randomly chosen masking. When words are replaced in order of their frequency of appearance, the 5-15% range may be achieved by replacing anywhere between 20 and 40% of the words, offering a very wide range of safety for the plagiarist.

Document Indexing Subversion

Extracting topics from a document is somewhat of a sub problem to the larger issue of document indexing. As information highly relevant to a search may appear in a small portion of a document, simply relying on the overall topic of every document to infer relevancy to a search may miss some useful results. A search engine should do more than simply topic modeling to show results for a query. In fact, Google® uses more than 200 metrics to determine search relevancy, including its page rank system of inferring quality of a site based on the number of sites linking to it.

Though documentation is sparse on other search engines such as Bing® or Yahoo! ®, Google® does host some discussion of its treatment of PDF files. It states that they can index "textual content . . . from PDF files that use various kinds of character encodings" but that are not encrypted. "If the text is embedded as images, we may process the images with OCR algorithms to extract the text," but for the content masking attack described herein, text is not embedded as images, so logically the system would not performs OCR.

Web sites can implement a simple search returning pages housing the query text, or they can use custom search engines offered by Google®, Yahoo! ®, or Bing®. Search engines and document repositories may be subverted by the content masking attacks described herein to display unexpected content also. In this case, the entire text of a PDF can be replaced without changing the rendered view, with a variety of implications. One may hide advertisements in academic papers or business fact sheets, for example, to spam users searching for information. In this exploit, the masking engine 120 can replace an entire document with the fewest number of fonts necessary, to avoid seeming particularly unusual. This must be done in a different way than for the topic matching exploit, due to changing the entire document rather than a few words.

Any part of (or all) the content of a PDF document can be changed to render as something else in this type of attack. The search results surfaced through this type of attack should render to make sense to the reader, so that an individual searching for certain terms will find a PDF document including strings of those words but displaying something entirely different. This results in a more extreme version of the one-to-many character mapping challenge from the attack against topic matching. Instead of masking a small finite number of words, the approach can mask the entire content of a document. However, this is facilitated by the realization that these masks are not necessarily delineated by spaces as before. The masking engine 120 can treat the entire document as a single word to be masked. It consequently encounters the word length disparity challenge, to treat the variation in length between real and rendered text, but only once.

Nevertheless, the strategy of adding new fonts, ad hoc, to cover each new mapping can quickly balloon out of control, in terms of the masking engine 120 needing to keep track of what mappings appear in what font. The number of fonts will increase with the number of characters to be masked, to an upper limit of every character needing a map to every other. Considering (for English) upper and lower case letters, numbers, and common punctuation (22 symbols, dependent upon count), all 26+26+10+22=84 characters must each map to the other 83 different characters, as well as themselves for those cases which a character and its mask are the same. This requires 84 fonts and represents $84^2=7056$ mappings. Code can certainly be written to automatically construct all these mappings, but to make this more efficient, an alternative 84 fonts are can be used, in each of which all characters map to one masking character. For example, in font "MaskAsA" character a maps to a, b to a, 4 to a, ! to a, etc. To mask a document as another, the masking engine 120 can be configured to simply apply fonts, character by character, that correspond to the desired mask. At the end of the documents, the three end behavior options presented as part of Algorithm 1 and illustrated in FIG. 2 can function here as well, to handle the length variation.

To demonstrate the efficacy of this attack, a handful of well-known academic papers were obtained and their content masked, and then placed on one author's university web site to be indexed by several leading search engines. For this simple proof of attack, one masking font which scrambled the letters for rendering was used. The resulting papers have legible text that render to gibberish, meaning that if they can be located by searching for that legible text, the search engine is fooled.

The site housing these papers was submitted to Google®, Bing®, and Yahoo! ®. The search engine DuckDuckGo® does not accept website submissions, but it was searched for the results. Table 1, below, lists the results of the content masking attack on these search engines. "Indexed Papers" indicates the search engine listed the papers in its index. "Attack Successful" means they are indexed using the underlying text, not the rendered gibberish. After a successful attack, the papers may later be put behind a spam warning or removed from the index, as shown in the last two columns.

Similar results were found for each of the five papers tested, that Bing®, Yahoo! ®, and DuckDuckGo® all indexed the papers according to the masked legible text. Yahoo!® did mark them as spam after two days but removed the spam warning days later.

TABLE 1

Results of Content Masking Attack on Search Engines

| Search Engine | Indexed Papers | Attack Successful | Evades Spam Detection | Not Later Removed |
|---|---|---|---|---|
| Google ® | √ | X | X | X |
| Bing ® | √ | √ | √ | √ |
| Yahoo! ® | √ | √ | Flagged/Cleared | √ |
| DuckDuckGo ® | √ | √ | √ | √ |

FIGS. 9A-9E illustrate results of the context masking attack against search engines according to various examples described herein. The masked paper is shown in FIG. 9A and contains no rendered English words beyond what is shown. FIGS. 9B, 9C, and 9E show the search results for the legible underlying text, and FIG. 9E shows the spam warning appearing days later but later disappearing. Each query was appended with "site:XXX.edu" to isolate the university web site where they are hosted for this proof of concept.

Google® indexed the papers, but according to the rendered gibberish, not the underlying text. This indicates, of these four engines, only it performs OCR on PDF files it indexes rather than extracting the text through PDFMiner or a similar tool. After two days, the papers were removed from Google's index, before the authors obtained screenshots. Thus, Google® may have a robust defense against the content masking attack, while the other three engines remain susceptible.

Defense Against Content Masking

As automatic assignment, plagiarism detection, and search engine systems eschew optical character recognition (OCR) for overhead, a comprehensive and lightweight alternative defense mechanism to the above-identified attacks is also described. While a naive method would perform OCR over the full document, unique characters used within the document can be rendered and OCR performed on the unique characters. This font verification defense method has several technical challenges in its implementation, due to the number and variety of glyphs within font files, and these issues are addressed in the algorithm described below. The algorithm performs at a roughly constant speed regardless of document length (a tenth of that for full document OCR at 10 pages), with glyph distinction accuracy just under 100% and with 100% content masking attack detection rate.

As mentioned, OCR is able to move the text extraction process from targeting the underlying text to the rendered version, preventing masking attacks. OCR is required for print documents scanned to PDF, but for documents with rendered text, system designers have avoided use of OCR in lieu of PDFMiner or similar packages. OCR is far more complex and requires more processing time than simply running the PDF file through a lightweight parser to collect its strings.

Thus, a lightweight font verification method is described herein that enables the use of OCR in a highly efficient way to identify content masking attacks. The OCR engine 128 can render each character glyph from a PDF and compare the results to the text strings from the PDF. Where a paper may include 50,000-75,000 characters, the fonts embedded therein usually contain at most just a couple hundred character glyphs.

While most PDF generation tools will embed only those letters used in the document, it is possible through Adobe InDesign, as one example, to embed the whole font. Some fonts accommodate many characters used in many other languages, and the upper limit on font character capacity is $2^{16}=65,536$ because characters have a two-byte index. Performing OCR on a font of that size will be equivalent to performing OCR on an academic paper in terms of computational overhead. Consequently, the OCR engine 128 can be configured to scan a document to extract the characters used in strings, and only render the character glyphs for those characters used. This requires iterating over the entire document, but the overhead is much less than with full-document OCR, as the process just builds a list from the series of character codes used rather than executing image processing techniques on all character glyphs in the fonts.

The OCR engine 128 then performs OCR on the series of character codes used in each font only.

The existence of many special characters within a font prompts the question of what characters OCR can distinguish and how to handle those it cannot. Theoretically, OCR may mature to the point where it can distinguish any sort of accent mark over normal letters, any characters used in languages other than English, and any additional special characters used in typeset mathematics, etc., and some OCR software may be currently in development working on a subset of these problems. However, the defense method described herein is ready to be integrated into current systems today.

A normal set of character codes is defined as those representing upper and lowercase English letters, numbers, and common punctuation, which English OCR packages target. Then, it is possible to check if the extracted character codes appear in this normal set or not. A letter in the normal set appearing as something other than itself is evidence of the content masking attack, as is a letter outside the normal set having the glyph of one inside. OCR is performed on all used characters in the font, as previously mentioned, and those within the normal set are required to have the correct respective glyph, while those outside the normal set are constrained not to have a distinguishable glyph (i.e., one appearing in the normal set).

The third issue arises with the fact that many special characters have high similarity with normal characters, especially for those fonts in common use which have many thousands of available characters. If one such special character is used legitimately in the text, the scheme just described will flag it as a content masking attack due to its similar appearance with a normal set character. Worse, common OCR tools presently available will conflate characters which humans can easily tell apart but for which the software is not precise enough to do so. For example, it is easy to tell visually that p and n are different characters, but not by common OCR tools.

A training step is thus introduced, wherein OCR is performed on the font and lists of intersections compiled. When the OCR engine 128 performs OCR on each represented character and the detected glyph for a special character appears like a normal letter, it is possible to check the list of characters similar to that normal letter. If the special character appears on that list, it can recognize that it may be valid without knowing if it is being used legitimately or as part of a content masking attack. As the purpose of the content masking attack is to disguise the visually rendered text as some other text for the computer to see, it is possible to replace the extracted character code for this letter as the normal letter it looks like, and pass this on to the end application. If content masking is occurring, the rendered text is sent to the plagiarism detector, reviewer assignment system, etc., thwarting the attack. Otherwise, the string in which this special character appears is with high probability not an English word and would not be useful to the end application anyway. A reviewer assignment system or plagiarism detector will not make use of mathematical equations when assigning reviewers, as these are not discernible words.

This training solution prompts one further issue, which is that different fonts will need to be trained independently as their nuances cause different sets of characters to appear similar. For the reviewer assignment and plagiarism detection problems, a limited number of fonts should be used, due to academic formatting requirements favoring a small set of fonts. Nevertheless, for other applications, such as search indexing, the only limit on the number of fonts that can be trained is that those fonts must be legible enough for an OCR tool to parse. These lists do not occupy too much space. For example, the lists for Times New Roman and Arial fonts are 29.4 KB and 36.2 KB, respectively. Once compiled, the OCR engine 128 can use this database to discern the real name of each font used in the document, to counteract the problem mentioned earlier, that an attacker may name a font anything desired. Open source OCR tools provide this functionality.

The training process begins by gathering a collection of fonts and training the system on each. For each character in a font's normal set, all special characters are tested for OCR similarity, and any identified as similar are added to the list for that normal character. The testing process performed by the OCR engine 128 for a new PDF file is outlined in Algorithm 2 below. The masking engine 120 and OCR engine 128 can perform Algorithm 2. In Algorithm 2, the list of characters and their fonts is reduced to unique combinations of those attributes, and each is then tested with OCR. Content masking attacks are detected in lines 12 and 17 when the underlying character index is a normal character other than the OCR-extracted character or when the underlying character index is a special character that does not appear in the similarity list for the OCR-extracted character. In these cases, this pseudocode exits to notify of the attack, though other behavior could be inserted here. This protects all end applications, except in the attack against plagiarism detection in which the attacker replaces normal characters with special characters similar in appearance. That specific attack is identified as possible at Line 15, in the case that the underlying character is a special character which appears in the similarity list for the OCR-extracted character. In this case, all instances of this character in the text extracted from this file are replaced with the OCR-extracted character for use in the end application.

---

Algorithm 2 Extract Rendered Text

---

Input: font list $F = \{f_1, f_2, ..., f_p\}$, normal character index set $N = \{n_1, n_2, ..., n_q\}$, special character index set $S = \{s_1, s_2, ..., s_r\}$, document character list $D = \{d_1, d_2, ..., d_s\}$
Output: extracted text $T = \{t_1, t_2, ..., t_s\}$
1:   Unique character index/font map list $U = \emptyset$
2:   for $i \leftarrow 1$ to $s$ do
3:     if $d_i \notin U$ then
4:       $U \leftarrow U \cup (d_i, \text{FONT}(d_i))$
5:   $m \leftarrow |U|$
6:   OCR-extracted character index set $O = \{o_1, o_2, ..., o_m\}$
7:   for $i \leftarrow 1$ to $m$ do
8:     $o_i \leftarrow \text{OCR}(u_i)$
9:     $f \leftarrow u_i.\text{font}$
10:     $L \leftarrow$ list of similar character lists $\{l_1, l_2, ..., l_v\}$ for $f$
11:     if $u_i.\text{index} \in N$ then
12:       if $o_i \neq u_i.\text{index}$ then    ▷ Attack Detected
13:         break
14:     else if $u_i.\text{index} \in S$ then
15:       if $u_i.\text{index} \in I_{o_i}$ then    ▷ Attack Possible
16:         $u_i \leftarrow o_i$
17:       else    ▷ Attack Detected
18:         break
19:   $T \leftarrow$ Apply modified $U$ to $D$
20:   return $T$

---

In a general case, a misdetection of OCR is defined as an error that OCR incorrectly detects a character as another character. The input to the training step are the commonly used font files. The OCR engine 128 performs OCR on all used characters in a font. For each represented character, the training step identifies misdetections of OCR and then marks these misdetections, such that the font verification does not raise false alarms to report the existence of attacks. Specifically, the OCR engine 128 performs OCR on each used character of a font file. When an OCR'd glyph is detected as another character (a misdetection happens), the font training step marks this character as a misdetection for this font and records the extracted character codes for the original and detected characters. For font verification, when the detected glyph of a character of the same font appears like another letter, the font verification checks if this character has a misdetection mark. If not, a possible attack is detected. Otherwise, the font verification step continues to check if the code of the detected letter has been recorded. If yes, no attacker will be reported. Otherwise, an attack is assumed.

The implementation for this defense method can be written in Python and employs PDF-Extract to extract font files from PDFs, textract to extract the text strings, and pytesseract, a Python wrapper for Tesseract OCR. The alternative to this font verification method is to perform OCR on the entire document, so Tesseract OCR is used for this purpose also for a fair comparison. This comparison will illustrate not only that the proposed method detects/mitigates the content masking attack as well as the naive full document OCR method, but that it performs far better in several scenarios common to PDFs both in and out of the presence of the content masking attacks described herein.

Figure 10:
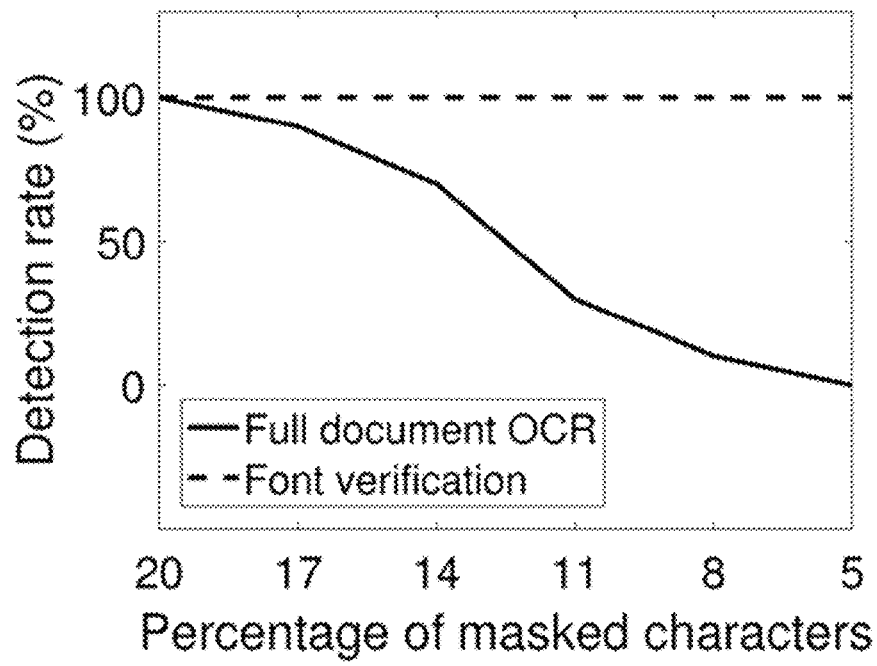
FIG. 10 illustrates results of font verification according to various examples described herein.

The performance of the two methods is compared with differing amounts of masked content. Ten PDF files are generated with masked characters varying from 5-20% in frequency of appearance, and both methods are applied to each of these files. The results are shown in FIG. 10, as well as a distinct benefit to the font verification method described herein compared with the traditional full document OCR. Here, detection rate refers to the correct extraction of rendered text and the consequent ability to prevent the content masking attack from occurring. For full document OCR, 10 PDF documents are generated with no content masking. The error in character recognition is measured, and this error is used as a threshold, such that the attack is flagged for one of the content masked PDF files if it is determined to have a larger difference between characters and their glyphs. That threshold was measured at 7%, and more than 20% of characters had to be masked before the full document OCR method detected the content masking attack (after this, detection was 100%).

The attack is considered detected by the masking engine 120 if Algorithm 2 flags it or the edge case approach of replacing special characters that look like normal letters with those normal letters will enable the end application (plagiarism/spam detector) to process the text properly and thereby flag the attack. In all cases, the algorithm detected the attack or constructed the proper English words required by the end application to detect it.

The disparity between the accuracy in the methods in the 5-20% character masking range can be attributed to a number of things. Fewer masked characters will appear in a sparser distribution, which makes them less visible among legitimate characters. OCR is affected by the distance between characters and the resolution of the image, among other things, which we can control in the case of font verification but which are not controlled when performing OCR over an entire document. An optimal image of all relevant characters can be generated, check their validity, flag detected attacks, and in the case of special characters which appear identical to normal letters, replace them with those normal letters for proper use in the end application.

Figure 11:
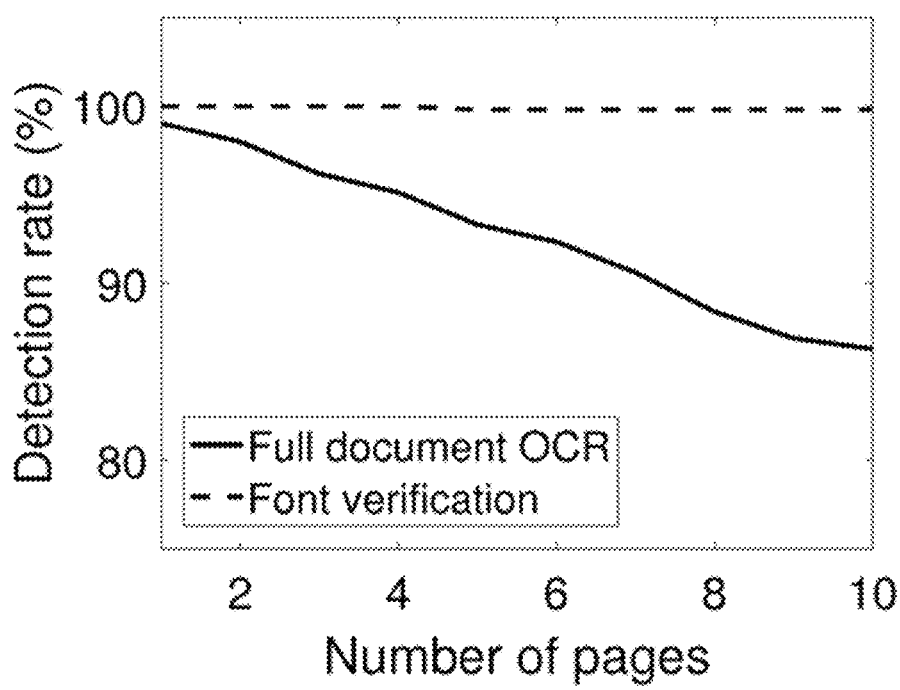
FIG. 11 illustrates additional results of font verification according to various examples described herein.

The effects of document length are also analyzed on the detection rate for each method, by comparing their results on 10 PDF files ranging from 1-10 pages in length and having an even 30% distribution of masked characters. FIG. 11 illustrates that while the font verification method is almost perfectly static, full document OCR gradually performs more poorly, and reaching 14% misdetection by page 10. The aforementioned OCR error rate explains this problem, where while 30% masked characters is above the required 20% to guarantee detection in the previous experiment, additional pages of text steadily allow more masked text to go unnoticed. The font verification appears to be 100% throughout, but actually dips to 99.8% halfway through. The method is not immune to the errors inherent to OCR as it also uses OCR, but it represents a more judicious approach to minimize those errors. In this case, OCR is confusing the ';' and ':' characters, which are rare but do exist in prose.

Figure 12:
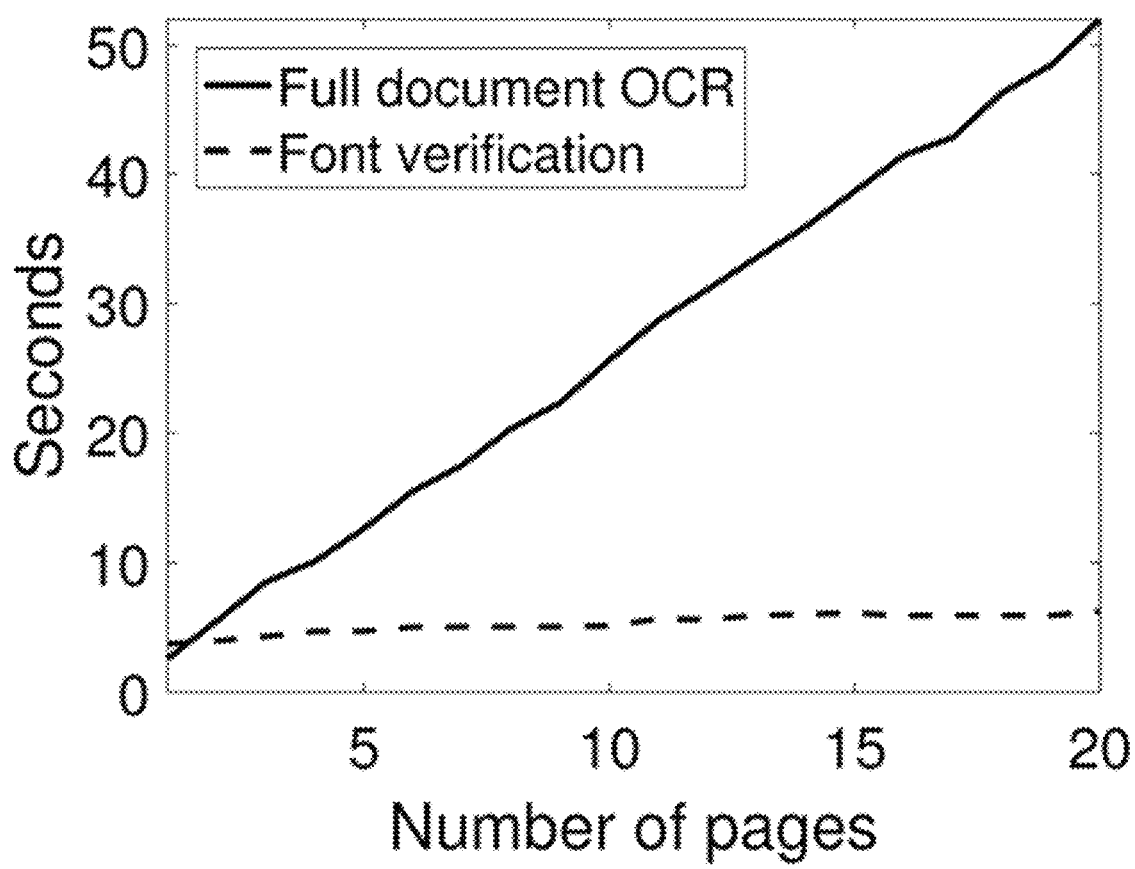
FIG. 12 illustrates performance gains using the font verification technique described herein as compared to full document optical character recognition according to various examples described herein.

Finally, the performance gain of the font verification method is demonstrated over the full document OCR method, on 20 PDF files ranging from 1-20 pages in length and having a 30% distribution of masked characters. As shown in FIG. 12, the full document OCR method increases linearly with pages added while the font verification method unsurprisingly remains largely static, increasing by roughly a second compared to the 45 experienced by the full document OCR method. In all, the method described herein requires about 6 seconds to check a 20 page document, rather than 50 seconds, using one core on a laptop processor (Intel i7 at 2.7 GHz). This provides far better scalability for the target systems than the alternative, and is easily applied to current systems without requiring upgrades.

Most exploit research targeting the PDF standard has been in bugs surrounding various programs rendering, displaying, exporting, or otherwise handling PDF documents. The not-for-profit MITRE Corporation lists in its Common Vulnerabilities and Exposures (CVE) collection 431 entries involving the keyword "PDF" and having to do with these external programs. These allow for arbitrary code execution on the host computer and all the associated security risks, including the establishment of botnets, data exfiltration, and other high-impact security issues. They are, however, limited to basic hacking-type exploits, zero-days chased by patches, and the PDF itself is essentially a vehicle for the hack. These attacks are not thematically novel, and the patches indeed follow the zero-days with reasonable speed.

Similarly, some exploration has been performed on the JavaScript execution ability within the PDF standard. When abused, this too allows for arbitrary code execution. Security researcher Didier Stevens offers a series of blogs discussing how to misuse this JavaScript execution, including how to encode the strings involved to create polymorphic malware resisting simple signature-based antivirus products. Some research finds that writing polyglots (code valid in multiple languages) within PDFs can expose security concerns depending on what language the reader uses to interpret the code. Successive updates to the PDF standard implement measures to block certain functions, such as reaching out to the Internet and placing their function behind a confirmation window for the user to view. Additionally, most current antivirus products offer real-time protection using heuristics that can detect potentially malicious behaviors despite simple code obfuscation.

Some academic research regarding PDF security analyzes the JavaScript being executed to verify safety. One work analyzes a set of static features extracted from the PDF, and then instruments with context monitoring code the JavaScript within. This combination static and run-time approach is tested on a collection of 18623 PDF documents without malware and 7370 with, resulting in few false negatives and no false positives. Other research targets attacks not dependent on JavaScript or other parsing vulnerabilities, including one that works to detect these attacks using machine learning on existing flagged PDF files using data extracted from the structure of the file as well as its content. One may expect this strategy to suffer from the same difficulties experienced by signature-based antivirus products, namely an inability to detect malware not already discovered by re-searchers. Another work allows PDF documents to be opened in an emulated environment to track how they behave before doing so in the host environment.

Similar works examine the possibility of causing PDF documents to be rendered differently on different computers, showing how to restrict the syntax of the PDF standard to prevent this from occurring. This attack against data consistency has some vague similarity to the concept of content masking—displaying different content for the human than the machine. Herein, several real-world examples of how content masking attacks can subvert real systems are shown, while the impact of the attack is relatively limited to the document looking different to users on different computers. Some works examine poisoning search results, but this is from the perspective of presenting false data to the machine through web site code or manipulations of the PageRank algorithm via botnets, an existing threat vector for which defenses have been continually adapting.

Figure 13:
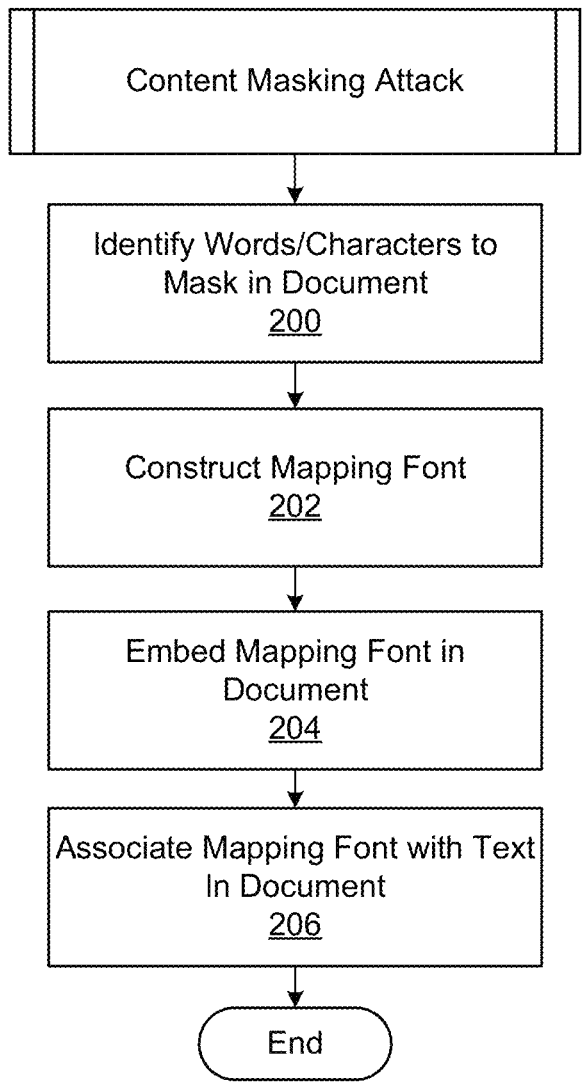
FIG. 13 illustrates an example content masking attack process according to various examples described herein.

FIG. 13 illustrates an example content masking attack process according to various examples described herein. Individual steps of the process shown in FIG. 13 can be performed by the computing environment 100 shown in FIG. 1 as described below. The process can also be performed by other computing environments, however, and is not limited to use with the networked environment 10. Additionally, although the flowcharts show an order of execution, the order of execution can differ from that which is shown. For example, the order of execution of two or more elements can be switched relative to the order shown or as described below. Also, two or more elements shown in succession can be executed concurrently or with partial concurrence. Further, in some examples, one or more of the elements shown in the flowcharts can be skipped or omitted.

The process shown in FIG. 13 can be applied to alter results provided by a reviewer assignment system, alter results provided by a plagiarism detection system, or subvert document indexing. The process can be executed on various types of document files, including PDF document files, among others.

At step 200, the process includes the mask identifier 124 identifying at least one character or word in a document file to mask as another character or word. For example, the process can identify one or more characters or words depending upon the type of content masking attack being performed (e.g., for reviewer targeting, plagiarism detection avoidance, or search indexing subversion). For reviewer targeting, as described above, the process can identify one or more words in the document file to replace with one or more topic words from documents in a reviewer's corpus. For plagiarism detection, the process can identify one or more characters (up to all characters) or words (up to all words) to mask as another character as described above. For search indexing subversion, as described above, the process can identify one or more words in the document file to replace with one or more topic words to be indexed.

In step 202, the process includes the font mapper 126 constructing a mapping font that maps the one or more of the characters identified at step 200 to render using a glyph associated with another character. Additionally or alternatively, the font mapper 126 can construct a mapping font that maps one or more words in the document file to one or more topic words in one or more target documents as described herein. When constructing the mapping font, the font mapper 126 can swap, replace, or edit character codes and/or glyphs in the mapping font to render certain characters and/or words for display as other characters or words.

In step 204, the process includes the document handler 122 embedding the mapping font constructed at step 202 into the document file. In step 206, the process also includes the document handler 122 associating the mapping font with one or more characters or word in the document file to mask content in the document file.

Figure 14:
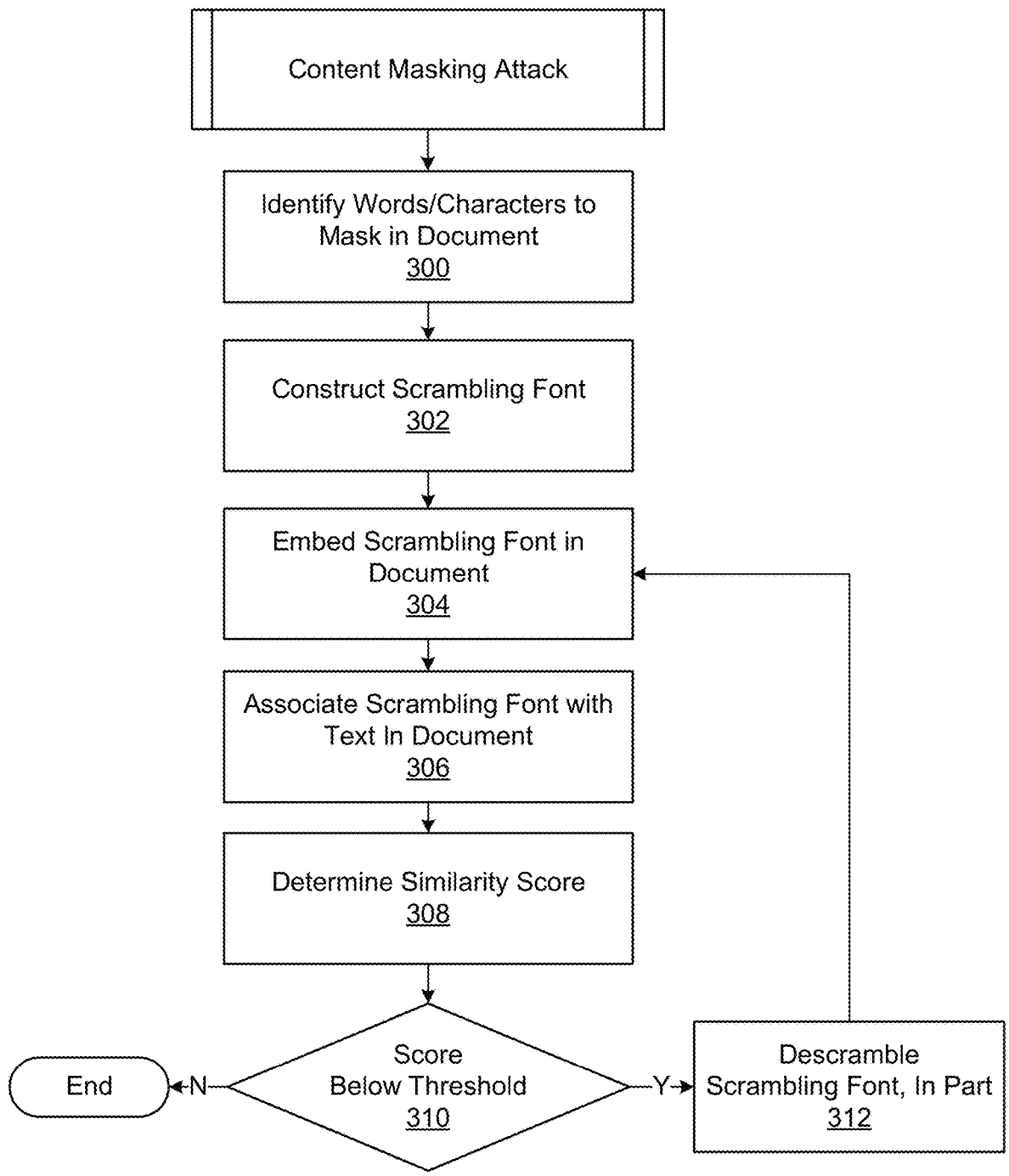
FIG. 14 illustrates another example content masking attack process according to various examples described herein.

FIG. 14 illustrates another example content masking attack process according to various examples described herein. The process shown in FIG. 14 is directed to alter the results provided by a plagiarism detection system, but it could also be used to alter results provided by a reviewer assignment system or subvert document indexing.

At step 300, the process includes the mask identifier 124 identifying at least one character or word in a document file to mask as another character or word. For example, the process can identify one or more characters or words depending upon the type of content masking attack being performed (e.g., for reviewer targeting, plagiarism detection avoidance, or search indexing subversion) as described herein.

In step 302, the process includes the font mapper 126 constructing a scrambling font that maps the one or more characters identified at step 30 to render using a glyph associated with another character. Additionally or alternatively, the font mapper 126 can construct a mapping font that maps one or more words in the document file to one or more topic words in one or more target documents as described herein. When constructing the mapping font, the font mapper 126 can swap, replace, or edit character codes and/or glyphs in the mapping font to render certain characters and/or words for display as other characters or words. In step 304, the process includes the document handler 122 embedding the mapping font constructed at step 202 into the document file.

In step 306, the process also includes the document handler 122 associating the mapping font with one or more characters or word in the document file to mask content in the document file. In one example, the document handler 122 can associate the scrambling font with at least one character or string of characters or text in the document file. In another example, the document handler 122 can associate the scrambling font with certain characters or words in the document file based on a frequency of appearance of the characters or words in the document file as described above.

At step 308, the process includes the masking engine 120 determining a similarity score for the document file using plagiarism detection software, such as Turnitin® or a related package. Further, at step 310, the process can include the masking engine 120 determining whether the similarity score for the document determined at step 308 using the plagiarism detection software is below a predetermined threshold. The predetermined threshold can be in a range of about 5-15% similarity, for example. If the similarity score is below that threshold, the document file may appear to be an outlier, identifying foul play, as described herein. If the similarity score is below the predetermined threshold, then the process proceeds to step 312. Otherwise, the process can end.

At step 312, the process includes the font mapper 126 descrambling at least one character of the scrambling font to generate an updated scrambling font to increase the similarity score. The descrambling can be based on a known frequency of usage of letters in a language as described above. The process then proceeds back to step 304 to embed the updated scrambling font into the document file. The process shown in FIG. 14 can occur iteratively until the similarity score is below the predetermined threshold at step 310.

Figure 15:
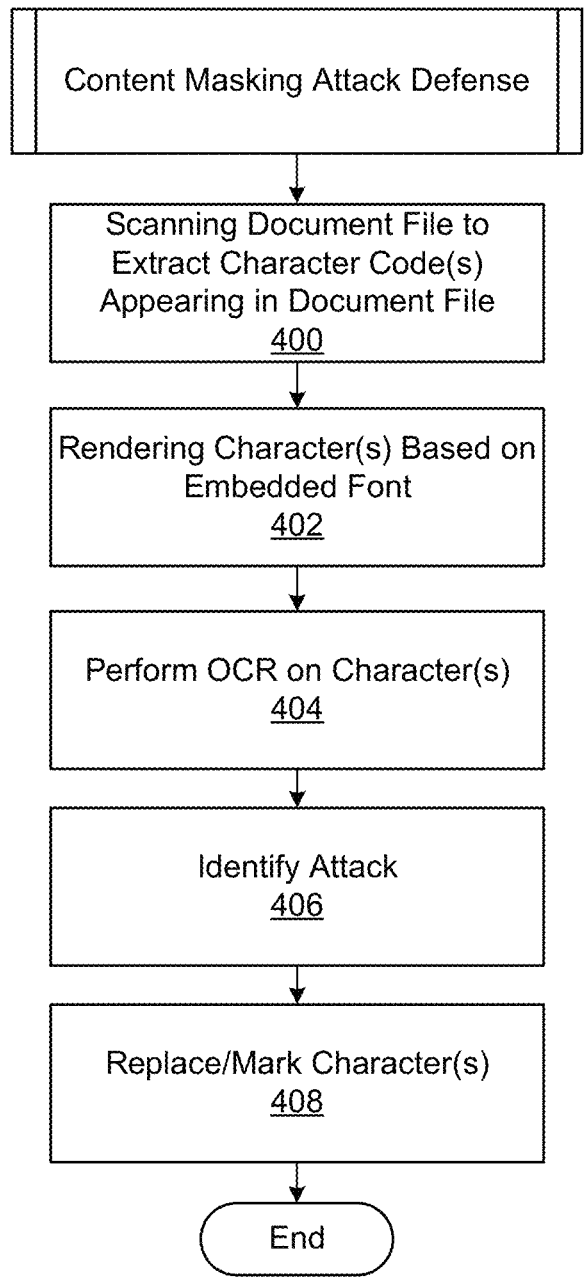
FIG. 15 illustrates an example content masking attack defense process according to various examples described herein.

FIG. 15 illustrates an example content masking attack defense process according to various examples described herein. At step 400, the process includes the document handler 122 scanning a document file to extract one or more character codes of one or more characters (or words) appearing in the document file. At step 402, the process includes the document handler 122 rendering the one or more characters identified at step 400 based on a font embedded in the document file. The characters can be rendered as the glyphs associates with the characters or character codes identified at step 404.

At step 404, the process includes the OCR engine 128 performing optical character recognition on the glyphs rendered at step 402. At step 406, the process includes the masking engine 200 identifying a content masking attack based on a comparison of a result of the optical character recognition from step 404 against the character code or codes of the characters from step 400. The content masking attack can be identified based on a mismatch between result of the optical character recognition from step 404 against the character code or codes of the characters identified from step 400.

At step 408, the process includes the masking engine 200 replacing any special character which the optical character recognition from step 404 identifies as a normal character with a character code for the normal character, so an application can meaningfully process text in the document file. Here, the masking engine 200 can mark any original character which the optical character recognition detects as an error and record the character codes of the original character and the detected character, so an application can meaningfully process text in the document file.

The flowcharts in FIGS. 13-15 show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client devices 130 can each include at least one processing circuit. Such a processing circuit can include, for example, one or more processors and one or more storage or memory devices that are coupled to a local interface.

The storage or memory devices can store data or components that are executable by the processors of the processing circuit. For example, the masking engine 120 and other components can be stored in one or more storage devices and be executable by one or more processors in the computing environment 100. The masking engine 120 and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the masking engine 120, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

At least the following is claimed:

1. A content masking defense method, comprising:
scanning, by at least one computing device, a document file to extract a character code of a character appearing in the document file;
rendering, by the at least one computing device, the character based on a font embedded in the document file, wherein rendering the character comprises rendering a glyph for the character;
performing, by the at least one computing device, optical character recognition on the rendered glyph; and
identifying, by the at least one computing device, a content masking attack based on a comparison of a result of the optical character recognition against the character code of the character.

2. The content masking defense method according to claim 1, further comprising replacing, by the at least one computing device, any special character which the optical character recognition identifies as a normal character with a character code for the normal character, so an application can meaningfully process text in the document file.

3. The content masking defense method according to claim 1, further comprising marking any original character which the optical character recognition detects as an error and recording character codes of the original character and the detected character, so an application can meaningfully process text in the document file.

4. The content masking defense method of claim 1, wherein the document file comprises a portable document format (PDF) file.

5. The content masking defense method of claim 1, wherein the content masking attack comprises altering results provided by a plagiarism detection system, a reviewer assignment system, or subvert document indexing.

6. The content masking defense method of claim 1, wherein the optical character recognition is configured to distinguish an accent mark over a letter.

7. The content masking defense method of claim 1, wherein the optical character recognition is configured to distinguish characters used in a language other than English.

8. The content masking defense method of claim 1, wherein the optical character recognition is configured to distinguish special characters used in typeset mathematics.

9. The content masking defense method of claim 1, wherein the character comprises one of uppercase English letters, lowercase English letters, numbers, punctuation marks, or special characters.

10. A content masking defense method, comprising:
scanning, by at least one computing device, a document file to extract one or more character codes of one or more characters appearing in the document file;
rendering, by the at least one computing device, the one or more characters, wherein rendering the one or more characters comprises rendering one or more glyphs for the one or more characters;
performing, by the at least one computing device, optical character recognition on the rendered one or more glyphs; and
identifying, by the at least one computing device, a content masking attack based on a mismatch between a result of the optical character recognition against the one or more character codes of the one or more characters.

11. The content masking defense method of claim 10, wherein the document file comprises a portable document format (PDF) file.

12. The content masking defense method of claim 10, wherein the one or more characters comprises one of uppercase English letters, lowercase English letters, numbers, punctuation marks, or special characters of a font embedded in the document file.

13. The content masking defense method of claim 10, wherein the content masking attack comprises altering results provided by a plagiarism detection system, a reviewer assignment system, or subvert document indexing.

14. The content masking defense method of claim 10, further comprising marking any original character which the optical character recognition detects as an error and recording character codes of the original character and the detected character, so an application can meaningfully process text in the document file.

15. The content masking defense method of claim 10, wherein the optical character recognition is configured to distinguish an accent mark over a letter.

16. The content masking defense method of claim 10, wherein the optical character recognition is configured to distinguish characters used in a language other than English.

17. The content masking defense method of claim 10, wherein the optical character recognition is configured to distinguish special characters used in typeset mathematics.

* * * * *